Nov. 5, 1963  H. J. BUTLER ETAL  3,109,517
DISC BRAKES
Filed Aug. 16, 1960  5 Sheets-Sheet 1
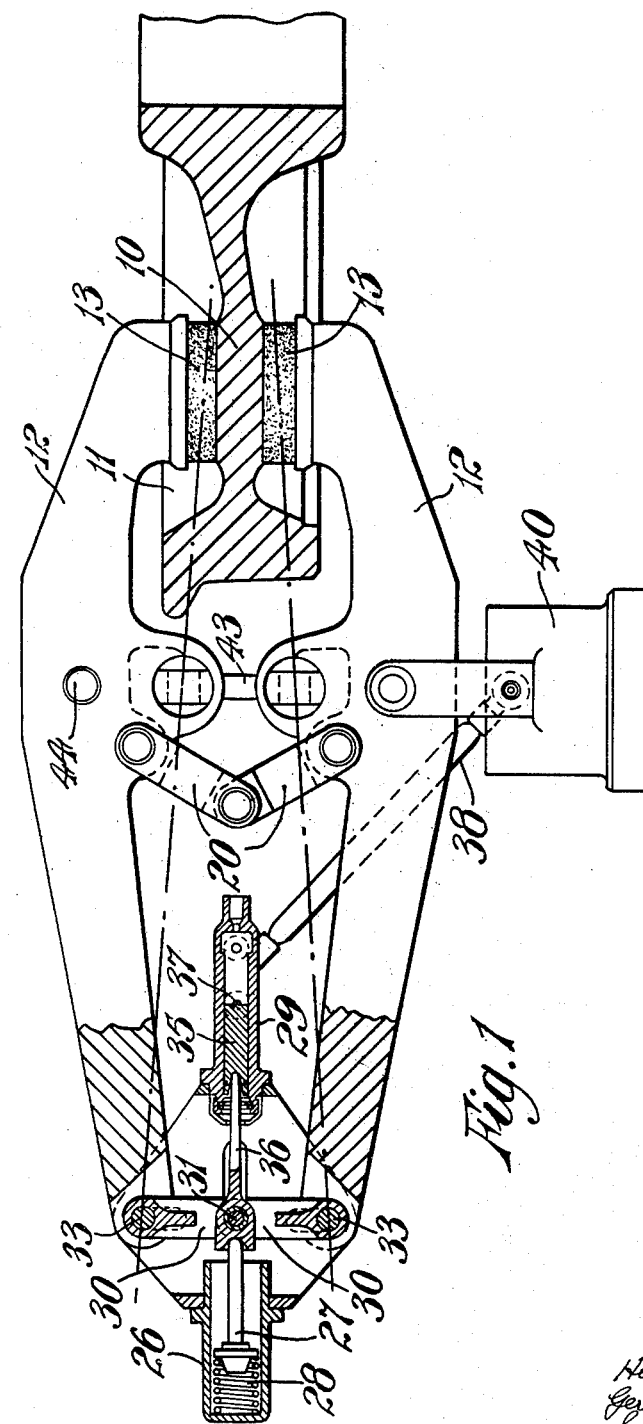
INVENTORS
Henry James Butler
Gerald Smith
by Benj. T. Bauber
their attorney

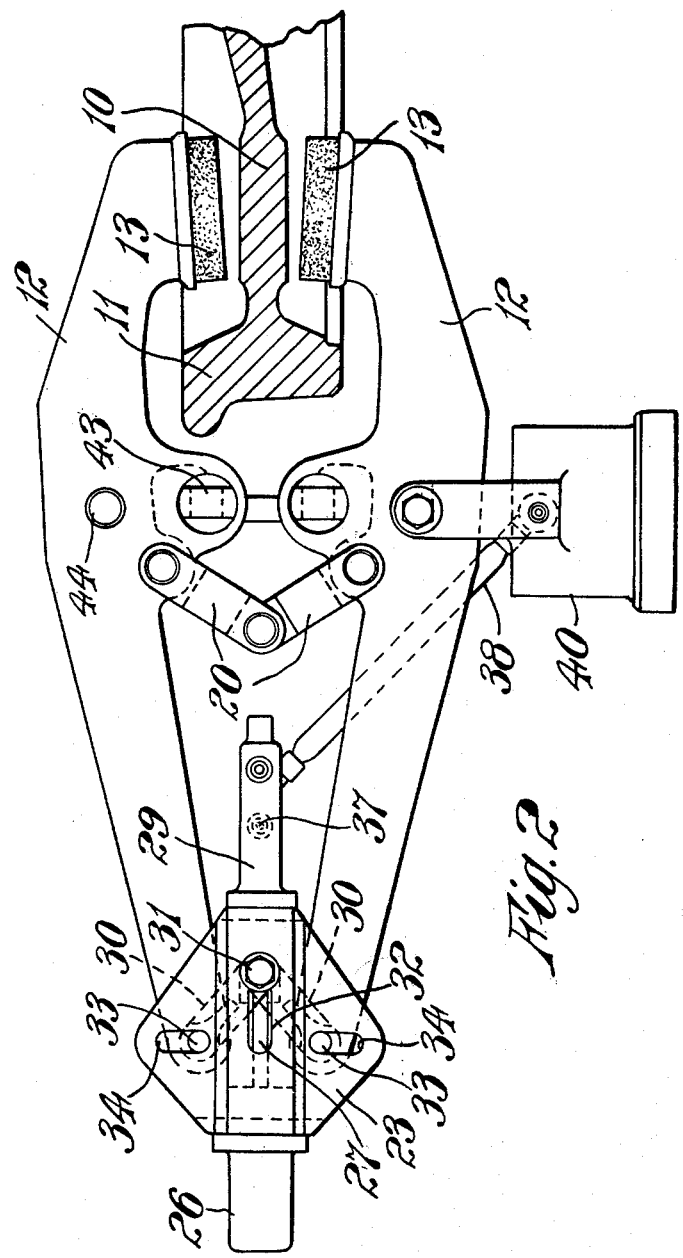

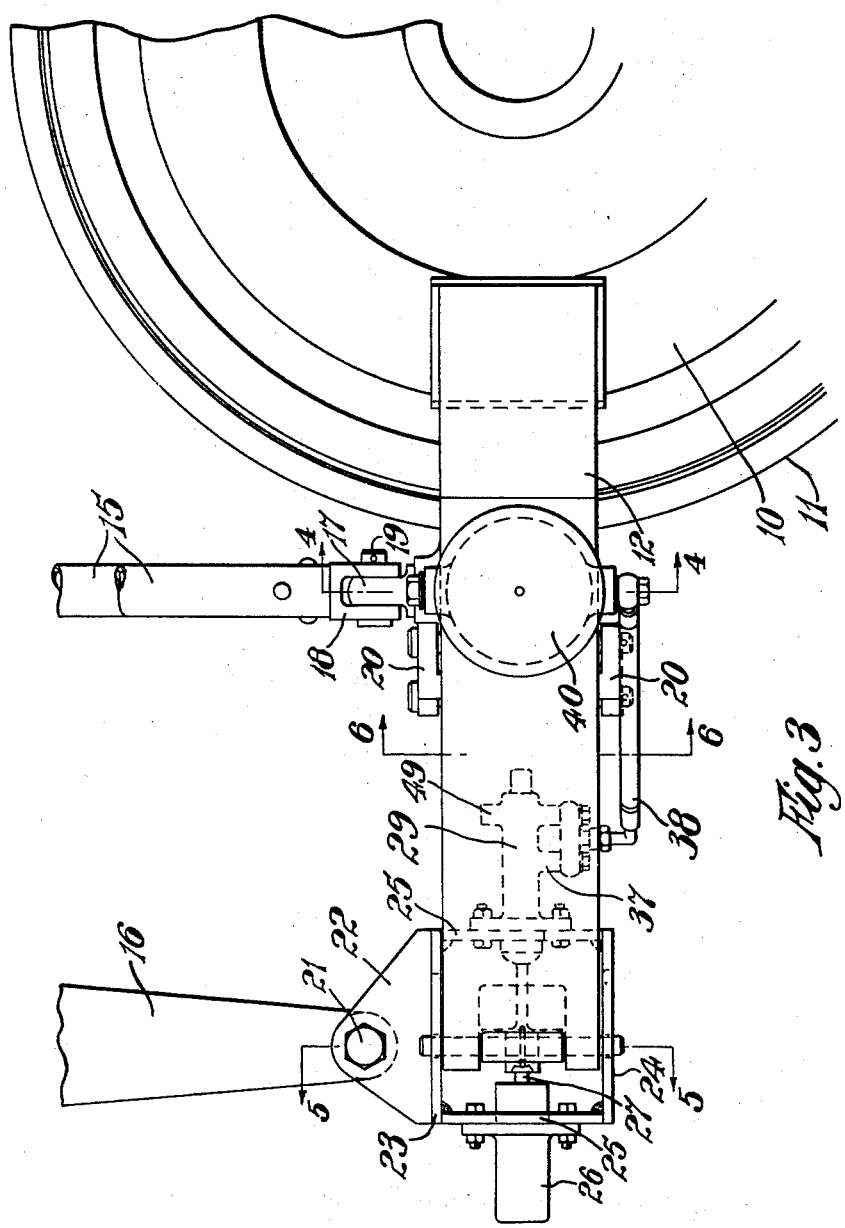

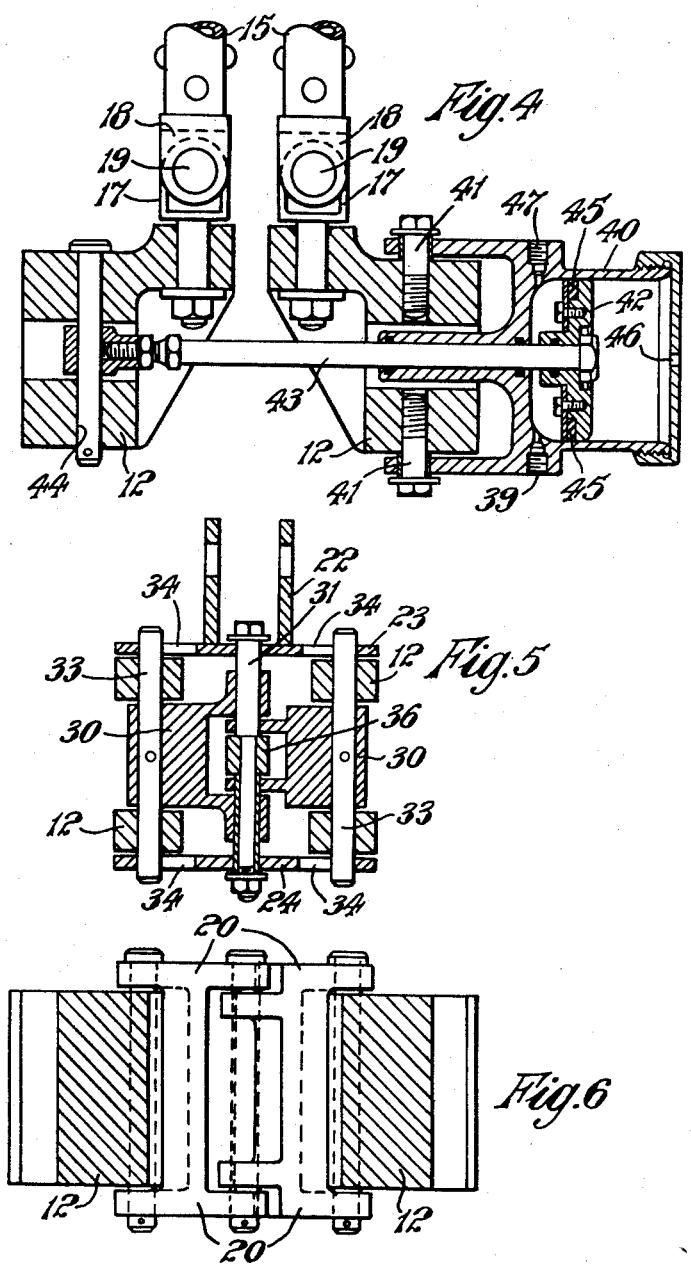

United States Patent Office 3,109,517
Patented Nov. 5, 1963

3,109,517
DISC BRAKES
Henry James Butler, Sutton Coldfield, and Gerald Smith, Nuneaton, England, assignors to Dunlop Rubber Company Limited, London, England, a British company
Filed Aug. 16, 1960, Ser. No. 49,961
Claims priority, application Great Britain Aug. 29, 1959
10 Claims. (Cl. 188—73)

This invention relates to a disc brake of the type comprising a pair of pressure-plates, each carrying a friction pad, which are movable about pivots in pincer fashion to bring the friction pads into engagement with opposite sides of a braking disc under control of a brake-applying mechanism.

A disadvantage of existing disc brakes of this type is that when wear of the friction pads has taken place a large quantity of fluid is passed from a master cylinder or other source to close the friction pads up to the disc before any braking force is applied. The quantity of fluid may even be such as to exhaust the master cylinder completely. This results in a time lag between application of the brakes to different wheels on a single vehicle, or on different vehicles in a vehicle train, and is therefore undesirable. With a view to obviating this disadvantage, the invention provides a disc brake of the above type in which each pressure-plate is mounted for pivotal movement about first and second centres and the brake-applying mechanism serves, on braking, first to impart a fixed angular movement to the pressure-plates about their first centres to close the pads on to the braking disc and thereafter to move the pressure-plates about their second centres to complete the braking engagement, said brake-applying mechanism also effecting progressive adjustment of the first centres as wear of the friction pads takes place so that the movement of the pressure-plates about the first centres remains effective to close the pad on to the braking disc.

Preferably the first centres are intermediate in the length of the pressure-plates and the second centres are at the ends of the pressure-plates remote from the friction pads. Preferably also the brake-applying mechanism comprises a pilot piston and cylinder arranged to perform a fixed stroke to impart movement to the pressure-plates about their first centres and a main piston and cylinder arranged to receive motive fluid from the pilot cylinder when the pilot piston uncovers a port in the pilot cylinder, the main piston and cylinder urging the first centres apart and serving to effect progressive increase in their spacing to compensate for wear of the friction pads.

Figure 7:
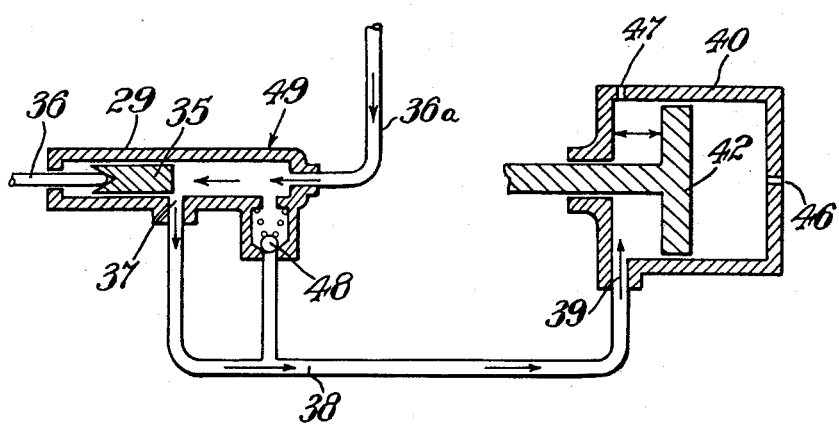
Figure 8:
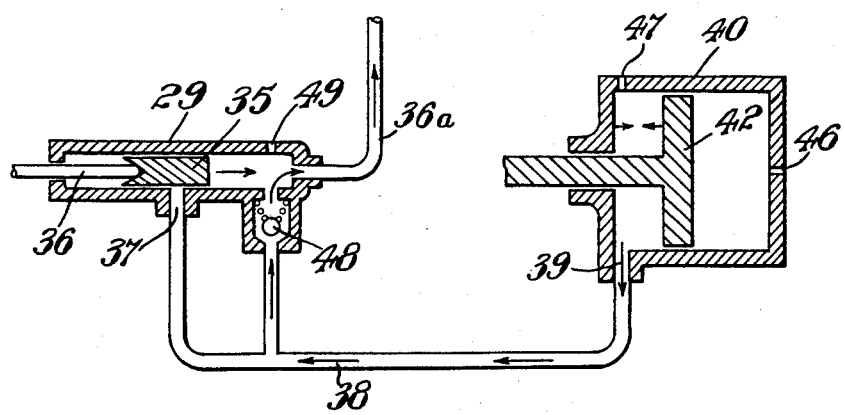

One embodiment of the invention as applied to a railway brake will now be described in detail, by way of example, with reference to the accompanying drawings, in which:

FIGURE 1 is a plan view, partly in section, of the braking mechanism showing the brake on, FIGURE 2 is a plan view showing the brake off, FIGURE 3 is a side elevation, FIGURES 4, 5 and 6 are respectively sections on the lines 4—4, 5—5, and 6—6 in FIGURE 3, and FIGURES 7 and 8 are diagrams respectively illustrating the flow of fluid when braking and releasing the brake.

Like reference numerals indicate like parts throughout the figures.

In the construction illustrated, the braking disc 10 constitutes part of the wheel 11 of the vehicle, but the brake disc can of course be separate from the wheel. The brake-applying caliper is constituted by pressure-plates 12 disposed on opposite sides of the brake disc 10 and carrying friction pads 13 at their front ends. The pressure plates 12 are supported by front and rear supports 15, 16 slung from the main structure of the vehicle, the front supports 15 being provided with universal joints at top and bottom. The bottom universal joints are constituted by swivelling eyebolts 17, pivotally mounted on the pressure plates 12 and connected to the forked lower ends 18 of the supports 15 by pins 19. The front supports 15 transmit the greater part of the brake reaction force to the main structure of the vehicle, while the rear supports 16 take a lesser part of the brake reaction.

The supports 15 and 16 support the pressure plates 12 at two locations spaced from each other and from the disc 10 and fixed relatively to the direction of rotation of the disc. The plates are thus rigidly supported against the force acting in a direction tangential to the rotation of the disc. The universal joints permit movement of the assembly of plates as a unit transversely of the plane of the disc to accommodate any sidewise shifting of the body of the vehicle or other element to which the elements 15 and 16 are secured relatively to the plane of the disc and to permit turning on a longitudinal axis of the plate assembly to accommodate any irregularity in the braking surface of the disc. The assembly of pressure plates operates as a unit unaffected by the minor shifting of position permitted by the universal joint suspension.

The pressure-plates 12 are connected by top and bottom pairs of torque links 20 which maintain them in the same plane. The lower end of the rear support 16 is pivoted at 21 to a forked rear support bracket 22 integral with a plate 23. The plate 23 and a correspondingly shaped lower plate 24 are joined by members 25 to form a box structure, to which is fixed at the rear thereof a casing 26 of a plunger 27, loaded by a spring 28 (FIGURE 1), and at the front a pilot cylinder 29. Between the plates 23, 24 are situated the forked rear ends of the pressure-plates 12 and also a pair of toggle links 30, pivoted together by a pin 31 which is movable in longitudinal slots 32 in the plates 23, 24 and pivoted at their ends to the pressure-plates 12 by pins 33 which are movable in transverse slots 34 in the plates 23, 24. The pin 31 extends through a hole in a push rod 36 disposed between a pilot piston 35 (FIGURE 1) in the pilot cylinder and the plunger 27.

The spring 28 urges the toggle links 30 to the position shown in FIGURE 2, in which the pins 33 are drawn together and the front ends of the pressure-plates 12 are maintained apart to hold the friction pads 13 away from the brake disc 10. The forward end of the pilot cylinder 29 is connected by a pipe 36ª (FIGURES 7 and 8) to a master cylinder (not shown). When fluid under pressure is delivered to the pilot cylinder 29 from the master cylinder, the pilot piston 35 is moved rearwardly against the action of the spring 28 to straighten the toggle linkage 30, thus forcing the rear ends of the pressure-plates 12 apart and causing them to pivot about their intermediate points of connection to the eye bolts 17 and bring the friction pads 13 into engagement with the brake disc 10 as shown in FIGURE 2. When the pilot piston 35 has moved rearwardly to an extent sufficient to straighten the toggle linkage 30, it unmasks a port 37 in the pilot cylinder, so admitting fluid under pressure to a flexible pipe 38 communicating with an inlet 39 (FIGURE 8) to a main cylinder 40 pivoted by pins 41 to one of the pressure-plates 12. The main cylinder contains a main piston 42, the piston rod 43 of which is pivoted by a pin 44 to the other pressure-plate. The pressure-plates 12 are thus caused to pivot about the pins 33 at their rear ends to press the friction pads 13 into firm engagement with the brake disc 10. The main piston 42 has a sealing ring 45 which is a tight fit in the cylinder 40.

The latter has a vent 46 to atmosphere and a bleed outlet 47 for expelling air when the cylinder is filled with hydraulic fluid. The pilot cylinder 29 has a similar bleed outlet 49.

When the port 37 is uncovered by the pilot piston 35, the main piston 42 is urged to the right as seen in FIGURES 4, 7 and 8 and the main cylinder 40 is urged to the left. As the result, the pressure-plates 12 are caused to pivot about their rear pivots 33 to press the pads 13 into firm engagement with the disc 10. The movement of the piston 42 and cylinder 40 is very small, and is conditioned by the amount of movement allowed by the elasticity of the sealing ring 45. On release of the hydraulic pressure from the master cylinder, the main piston 42 and the main cylinder 40 execute a slight return movement, again to the extent permitted by the elasticity of the sealing ring 45, fluid being returned from the cylinder 40 to the cylinder 29 through a non-return valve 48 as shown in FIGURE 8. The pilot piston 35 is returned to its initial position by the spring 28 to retract the pads 13 from the disc 10.

The line joining the front and rear pivots 17, 33 of each pressure-plate 12 passes substantially through the centroid of the friction pad 13 when it is new. When new and when very worn however, the friction face of the pad 13 to which the braking forces are applied, is offset from the pivotal mounting line by a small amount thus imposing a torque on the pressure-plate 12. The torque in the opposite pressure-plate 12 is substantially equal to this and acts in the opposite direction and the torque links 20 serve to equilibrate these opposing torques.

The pilot piston 35 thus has a fixed stroke and is effective to bring the pads 13, whatever their state of wear, into contact with the disc 10, the pressure-plates 12 first pivoting about their front pivots 17. There is thereafter a small pivotal movement of the pressure-plates 12 about their rear pivots 33 to complete the braking engagement. Adjustment for wear is carried out as follows. Assuming for the purpose of explanation that the brake is fully engaged and is subjected to a prolonged period of hard braking sufficient for wear of the pads to be significant. The pilot piston 35 has forced the pressure plates 12 into the position shown in FIGURE 1 and the rear pivots 33 fixed so that if the pads are to remain firmly in contact with the disc as wear occurs the front pivots 17 will have to move towards each other. This necessitates a movement of the piston 42 and seal 45 to the right, and a movement of the cylinder 40 to the left as seen in FIGURES 4, 7 and 8. On release of the brake there is no force tending to move the piston 42 to the left or the cylinder 40 to the right except the very slight movement allowed by the elasticity of the tight fitting seal 45. Accordingly as wear occurs the piston is re-positioned further to the right in the cylinder 40. Thus the amount of clearance between the brake pads 13 and the disc after every brake application will be governed by the geometry of the linkage associated with the pilot piston 35. This is invariable and consequently the clearance of the pads 13 from the disc remains the same throughout the life of the pad and irrespective of the wear of the pad.

Since there is automatic compensation for pad wear the brake may be applied repeatedly without increase in the amount of fluid delivered by the master cylinder in any one application regardless of the state of pad wear. Some fluid will be transferred to the piston and cylinder mechanism as wear takes place but the amount transferred per brake application will be insignificant.

The brake illustrated is particularly suitable on installations where it is necessary to have a large clearance between the friction pads and the disc when the pads are in the "off" position.

Having now described our invention, what we claim is:
1. A disc brake comprising a rotatable disc, a pair of pressure elements spaced on opposite sides of the plane surfaces of said disc and having end portions extending toward the axis of rotation of said disc to overlap axially aligned areas of the braking surfaces on opposite sides of said disc, each said end portion having a friction pad facing the adjacent braking surface of said disc, an outer support for said pressure elements beyond the perimeter of said disc and fixed relatively to the direction of rotation of said disc, an intermediate support for said pressure elements between said outer support and the perimeter of said disc, an outer means to move said ends of said pressure elements adjacent said outer support toward and from each other, and intermediate means acting on said pressure elements between said outer means and the perimeter of said disc to move said pressure elements toward and from each other.

2. The apparatus of claim 1 in which each said means to move said pressure elements toward and from each other comprises a fluid pressure means.

3. The apparatus of claim 1 in which said outer means to move the ends of said pressure elements adjacent to said outer support comprises a cylinder secured to a fixed part of said support and a piston in said cylinder operatively connected to said pressure elements.

4. The apparatus of claim 1 in which said outer means to move said pivotal supports toward and from each other comprises a pair of toggle links connected to said pivotal supports and a fluid actuated means to move said links toward and from alignment.

5. The apparatus of claim 1 in which said intermediate means comprises a cylinder secured to one of said pivotal supports and a piston movable in said cylinder and connected to the other pivotal support.

6. The apparatus of claim 5 having a sealing ring of resilient material secured to said piston and tightly fitting the surface of said cylinder to move with said piston on a brake applying stroke and to retract said piston by the resilience of said ring upon a return stroke.

7. The apparatus of claim 2 comprising means to admit pressurized fluid in sequence to the fluid pressure means of said outer means and to the fluid pressure means of said intermediate means.

8. The apparatus of claim 1 in which said outer means to move said pressure elements comprises a cylinder secured to said outer support, a piston movable in said cylinder under pressure, a pair of toggle links connected to said pressure elements and to said piston to move said links toward and from alignment, and said intermediate means comprises a cylinder connected to one of said pressure elements and a piston in said cylinder connected to the other of said pressure elements between said outer support and the perimeter of said disc and means to supply pressurized fluid in sequence first to the cylinder secured to said outer support and then to said cylinder secured to said pressure element.

9. The apparatus of claim 8 in which said means to supply pressurized fluid to said outer means comprises a supply conduit to the cylinder secured to said outer support and a conduit leading from said cylinder secured to said outer support to said cylinder secured to said pressure element.

10. The apparatus of claim 1 comprising supporting means to secure said assembly of pressure elements at said outer support and at said intermediate support and a universal joint in said supporting means to permit adjustment of said supports sidewise of the plane of said disc.

References Cited in the file of this patent

UNITED STATES PATENTS

| | | |
|---|---|---|
| 2,115,083 | Pierce | Apr. 26, 1938 |
| 2,152,022 | Boetto | Mar. 28, 1939 |
| 2,284,605 | Eskergian | May 26, 1942 |
| 2,873,004 | Polanin | Feb. 10, 1959 |